United States Patent [19]

Kitamura

[11] Patent Number: 5,020,201
[45] Date of Patent: Jun. 4, 1991

[54] MACHINE TOOL

[75] Inventor: Koichiro Kitamura, Takaoka, Japan

[73] Assignee: Kitamura Machinery Co., Ltd., Toyama, Japan

[21] Appl. No.: 397,417

[22] PCT Filed: Mar. 10, 1988

[86] PCT No.: PCT/JP88/00250
§ 371 Date: Aug. 15, 1989
§ 102(e) Date: Aug. 15, 1989

[87] PCT Pub. No.: WO88/06943
PCT Pub. Date: Sep. 22, 1988

[30] Foreign Application Priority Data

Mar. 17, 1987 [JP] Japan .................. 62-60031

[51] Int. Cl.$^5$ ............................ B23B 3/16
[52] U.S. Cl. .......................... 29/27 C; 29/39; 29/27 R; 82/121; 82/120; 409/211; 409/219
[58] Field of Search ............ 29/27 R, 27 C, 26 A, 29/39, 40; 409/222, 221, 224, 211, 201, 164, 219; 82/121, 120, 122; 408/35

[56] References Cited

U.S. PATENT DOCUMENTS

| | | | |
|---|---|---|---|
| Re. 31,288 | 6/1983 | Matsuzak et al. | 29/27 C |
| 2,369,425 | 2/1945 | Becker | 409/222 X |
| 2,534,333 | 12/1950 | Wyrick | 29/39 X |
| 2,536,937 | 1/1951 | Hosea | 409/164 |
| 2,685,122 | 8/1954 | Berthiez | 408/35 X |
| 2,838,963 | 6/1958 | Goode et al. | 29/39 X |
| 2,889,722 | 6/1959 | Laubach | 82/122 |
| 3,486,209 | 12/1969 | Shultz | 408/35 |
| 3,523,469 | 8/1970 | Traugott | 408/35 |
| 3,546,774 | 12/1970 | Stoferle et al. | 408/35 |
| 3,587,390 | 6/1971 | Lohneis et al. | 409/164 X |
| 3,662,442 | 5/1972 | Noa | 82/122 X |
| 3,703,027 | 11/1972 | Geyler | 408/35 X |
| 3,742,791 | 7/1973 | Sato | 82/122 |
| 3,750,244 | 8/1983 | Smith | 408/35 X |
| 3,750,245 | 8/1973 | Kennedy et al. | 29/39 |
| 3,845,532 | 11/1974 | Smith | 29/40 |
| 3,846,880 | 11/1974 | Foll et al. | 29/39 X |
| 3,918,331 | 11/1975 | Svanstrom | 82/121 |
| 4,006,518 | 2/1977 | Rudolph et al. | 29/39 |
| 4,051,750 | 10/1977 | Berly | 82/121 X |
| 4,054,975 | 10/1977 | Lundstrom | 408/35 X |
| 4,080,853 | 3/1978 | Goto | 408/35 X |
| 4,090,281 | 5/1978 | Hautau | 408/35 X |
| 4,118,844 | 10/1978 | Matsuzaki et al. | 29/568 X |
| 4,180,894 | 1/1980 | Link | 408/35 X |
| 4,197,769 | 4/1980 | Smith et al. | 82/122 X |
| 4,327,612 | 5/1982 | Bazvin | 82/121 |
| 4,413,539 | 11/1983 | Ishizuka et al. | 82/121 X |
| 4,597,155 | 7/1986 | Garnett et al. | 408/35 X |
| 4,683,626 | 8/1987 | Steiner | 29/40 |
| 4,683,787 | 8/1987 | Link | 409/211 |
| 4,700,442 | 10/1987 | Lahm | 29/39 |
| 4,738,170 | 4/1988 | Isawa et al. | 29/40 X |
| 4,819,311 | 4/1989 | Hashimoto et al. | 409/201 X |
| 4,843,691 | 7/1989 | Hafla et al. | 29/27 C |

FOREIGN PATENT DOCUMENTS

| | | |
|---|---|---|
| 0214090 | 3/1987 | European Pat. Off. . |
| 2753386 | 5/1979 | Fed. Rep. of Germany .......... 29/40 |
| 53-28875 | 3/1978 | Japan . |
| 57-114338 | 7/1982 | Japan . |
| 854032 | 3/1985 | Japan . |
| 1101047 | 1/1968 | United Kingdom .............. 82/122 |
| 2156712 | 10/1985 | United Kingdom . |

Primary Examiner—Z. R. Bilinsky
Assistant Examiner—Robert Schultz
Attorney, Agent, or Firm—Ronald P. Kananen

[57] ABSTRACT

This invention relates to a machine tool having a table for mounting a workpiece. The body of a machine tool is equipped with a table for mounting a workpiece. The table is further equipped with a rotary table. When performing turning operations of the workpiece, the workpiece is mounted on the rotary table. On the other hand, when performing other operations, except for the turning operation, the workpiece is mounted on the non-rotary table. In addition, if desired, the workpiece can be mounted on both the table and the rotary table for performing other operations.

10 Claims, 11 Drawing Sheets

MACHINE TOOL

BACKGROUND OF THE INVENTION

1. Technical Field

This invention relates to a machine tool which has a table for mounting a workpiece.

2. BAckground Art

Machining operations of a cylindrical workpiece, for example, will be explained hereinafter. In the case of a turning operation of the outer cylindrical surface of a workpiece and a slotting operation of the flat end portion thereof, the workpiece must first be supported between a spindlehead of a lathe and a tailstock of the lathe. After that, the workpiece is removed from the lathe and then mounted on a table of a vertical milling machine. The table is horizontally moved and a slot is produced in the end portion of the workpiece by rotating an endmill.

In practice it is troublesome to remove the workpiece from the lathe to the vertical milling machine for performing the machining operations. In addition, since both the lathe and the vertical milling machine are necessary for the machining operations, considerable floor space is required to accommodate both the lathe and the vertical milling machine.

SUMMARY OF THE INVENTION

In order to solve the aforenoted problems, a main object of this invention is to provide a machine tool which can perform a plurality of operations, such as turning and milling.

According to this invention, provision is made for a machine tool which has a table for mounting a workpiece thereon so as to machine the workpiece, characterized in that the table is provided with a rotary table.

Accordingly, the machine tool of this invention can perform several operations, such as turning and milling. Thus, it is not necessary to reset or remove the workpiece from a machine tool to another machine tool. Furthermore, it is easy to machine the workpiece. In addition, the machine tool according to this invention reduces the number of machines required and as a result the installation floor space need not be as large as with several machines.

DETAILED DESCRIPTION OF THE INVENTION

Figure 1:
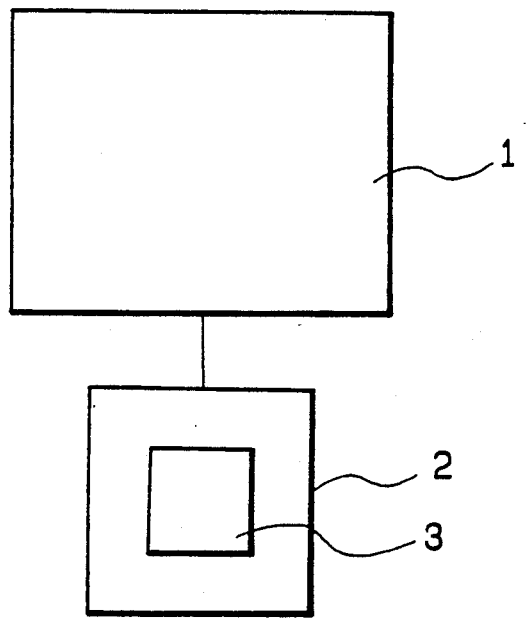
FIG. 1 schematically shows a machine tool according to this invention.

FIG. 1 schematically shows this invention. A body 1 of a machine tool is equipped with a table 2. The table 2 is also equipped with at least a rotary table 3.

Figure 2:
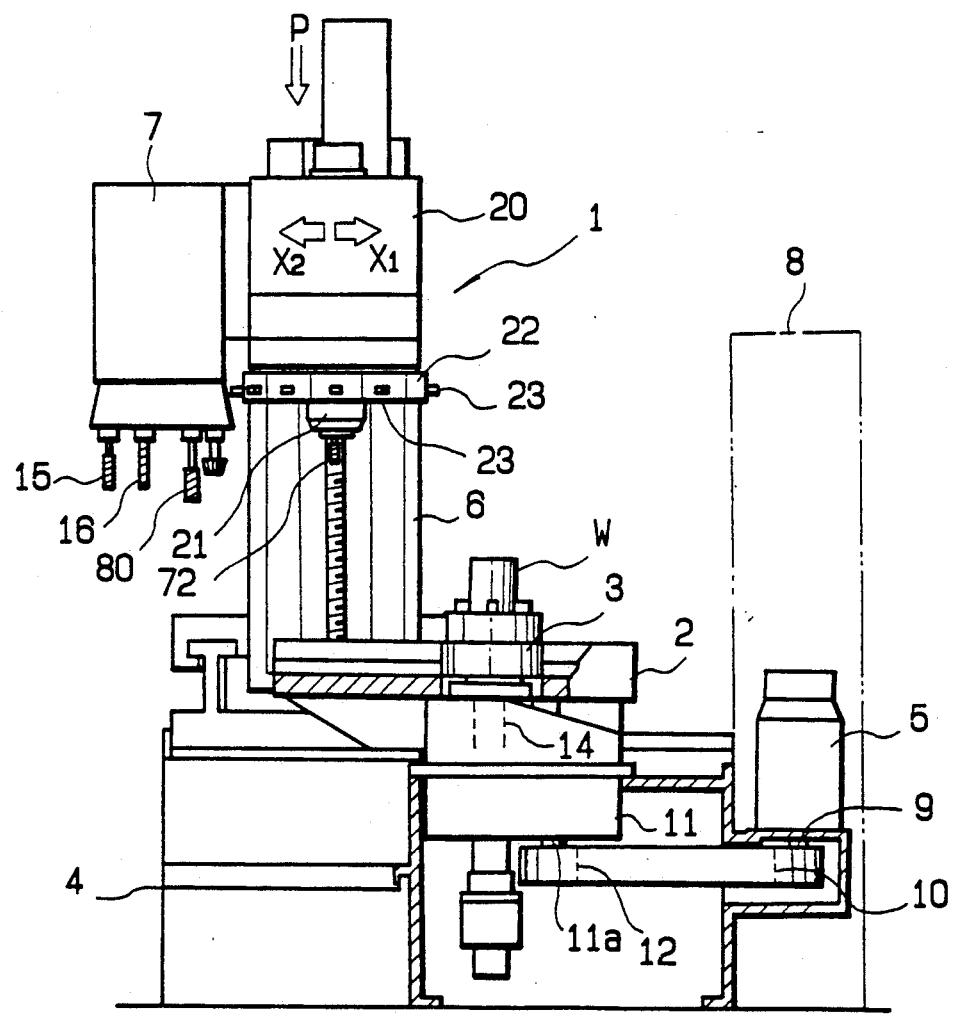
FIG. 2 is a front view showing, partly in cross-section, of the machine tool.

Referring now to FIG. 2, a base 4 of the body 1 has the table 2, the rotary table 3 and a motor 5. A CNC unit 8 is arranged near the base 4 of the body 1. A pulley 10 is attached to an output shaft 9 of the motor 5 while a pulley 12 is attached to a shaft 11a of a gear box 11. A toothed belt 13 (FIG. 3) is arranged between the pulleys 10 and 12. The shaft 11a can transmit power to a shaft 14 by way of gears (not shown). The rotary table 3 is fixed for rotation on an upper portion of the shaft 14.

An automatic tool changer 7, publically known, is provided with a plurality of tools, such as a tap 15, a drill 16 and an endmill 80.

A spindlehead 20 is provided with the automatic tool changer 7, a spindle 21, and a turret member 22. An endmill 72 is mounted in the spindle 21. The turret member 22 detachably holds a plurality of tool bits 23 for turning operations.

Figure 3:
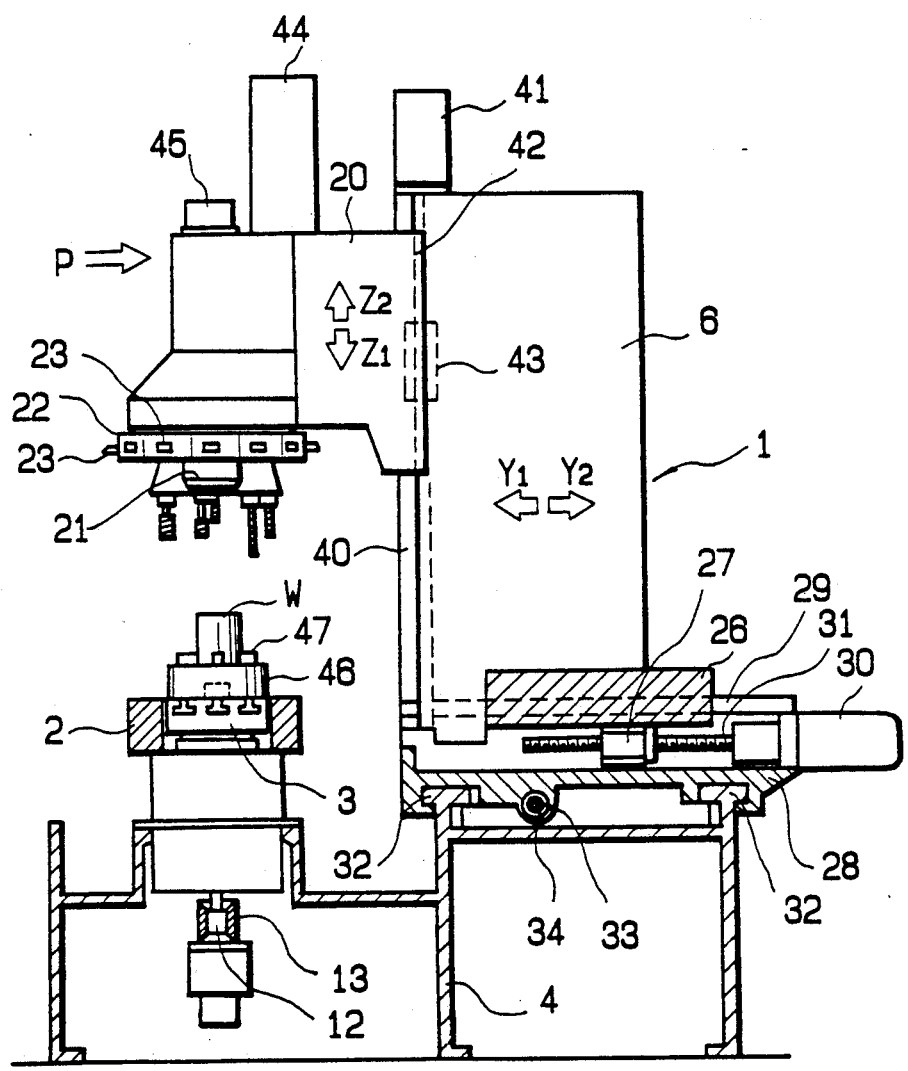
FIG. 3 is a side elevational view showing, partly in cross-section, of the machine tool.
Figure 4:
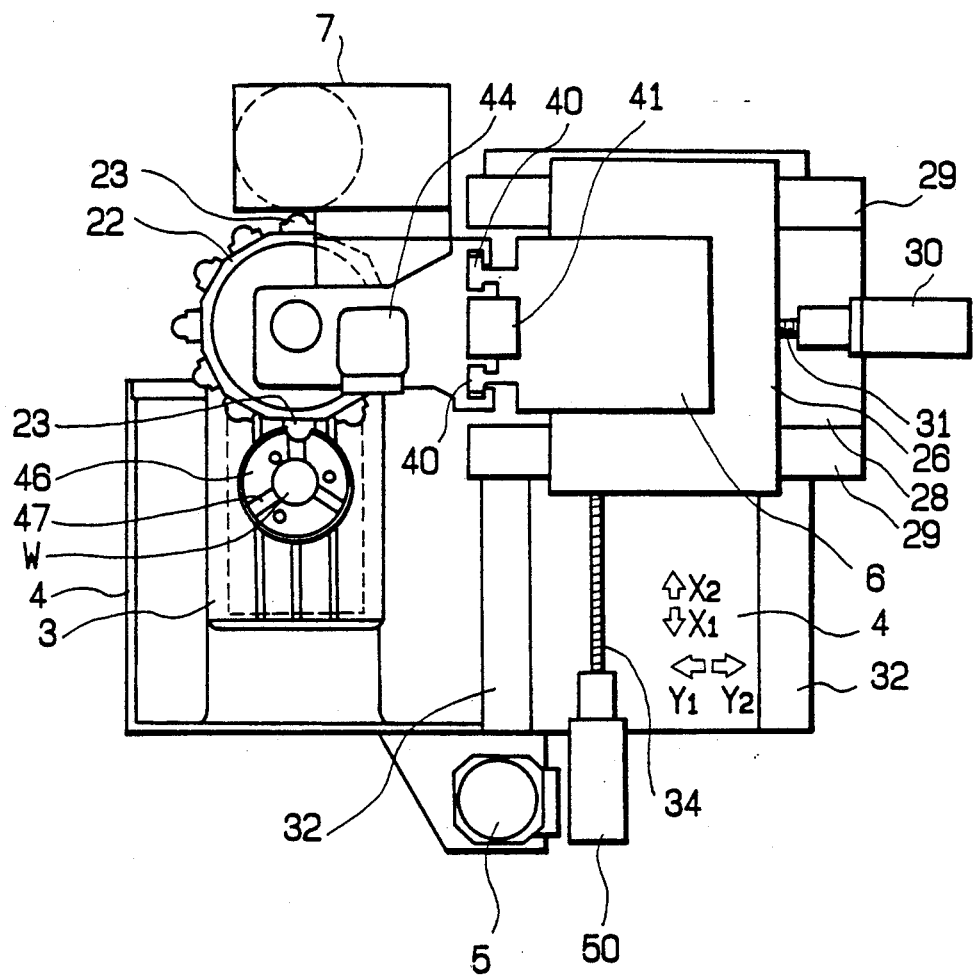
FIG. 4 is a plan view showing the machine tool.

Referring to FIG. 3, a column 6 is fixed on a first sliding member 26. A nut 27 is fixed to an underside of the first sliding member 26. A second sliding member 28 is equipped with a pair of guide rails 29, 29 (FIG. 4). Also, a servomotor 30 is mounted in the second sliding member 28. A feed screw 31 of the servomotor 30 engages the nut 27. The feed screw 31 can be rotated by the servomotor 30. By operating the servomotor 30, the first sliding member 26 can be moved along the guide rails 29, 29 of the second sliding member 28 in the direction of arrow $Y_1$ or arrow $Y_2$ (FIG. 3).

Guide rails 32, 32 are horizontally arranged on an upper portion of the base 4. The second sliding member 28 can be moved on the guide rails 32, 32. The second sliding member 28 has a nut 33. The nut 33 and a feed screw 34 engage each other.

The spindlehead 20 is provided with a nut 43. The nut 43 and a feedscrew 42 engage each other. The feed screw 42 can be rotated by a servomotor 41. Accordingly, the spindlehead 20 can be moved by operating the servomotor 41 along the pair of the guide rails 40, 40 (FIG. 4) in the direction of the arrows $Z_1$ or $Z_2$ (FIG. 3). The spindlehead 20 is provided with a motor 44 and an actuator 45.

A chuck 46 is detachably mounted on the rotary table 3. The workpiece W is clamped by plurality of jaws 47 of the chuck 46. The chuck 46 is a conventional chuck, such as a hydraulic power chuck.

FIG. 4 clearly shows the pair of guide rails 40, 40, the guide rails 29, 29 and a servomotor 50. By operating the servomotor 30, the first sliding member 26 and the column 6 can be moved in the direction of arrows $Y_1$, or $Y_2$ In addition, by operating the servomotor 50, the first sliding member 26, the second sliding member 28 and the column 6 can be moved in the direction of arrows $X_1$, or $X_2$ with respect to the base 4.

Figure 5:
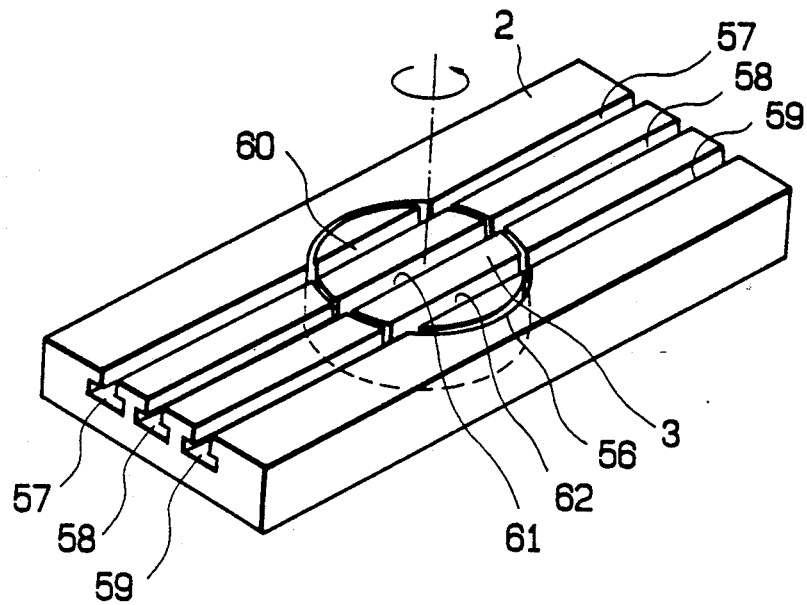
FIG. 5 is a perspective view showing a table and a rotary table.

FIG. 5 shows the table 2 and the rotary table 3. A hole having a circular cross-section 56 is formed in the center portion of the table 2. The rotary table 3 is rotatably arranged within the hole 56. The table 2 is not a rotary table and is fixed on the base 4. T-slots 57 to 59 are machined in the table 2 along the longitudinal direction thereof for this embodiment. Also, T-slots 60 to 62 are machined in the rotary table 3. As the rotary table 3 is in an initial position, shown in FIG. 5, the T-slots 57 to 59 are aligned with the T-slots 60 to 62, respectively.

Figure 6:
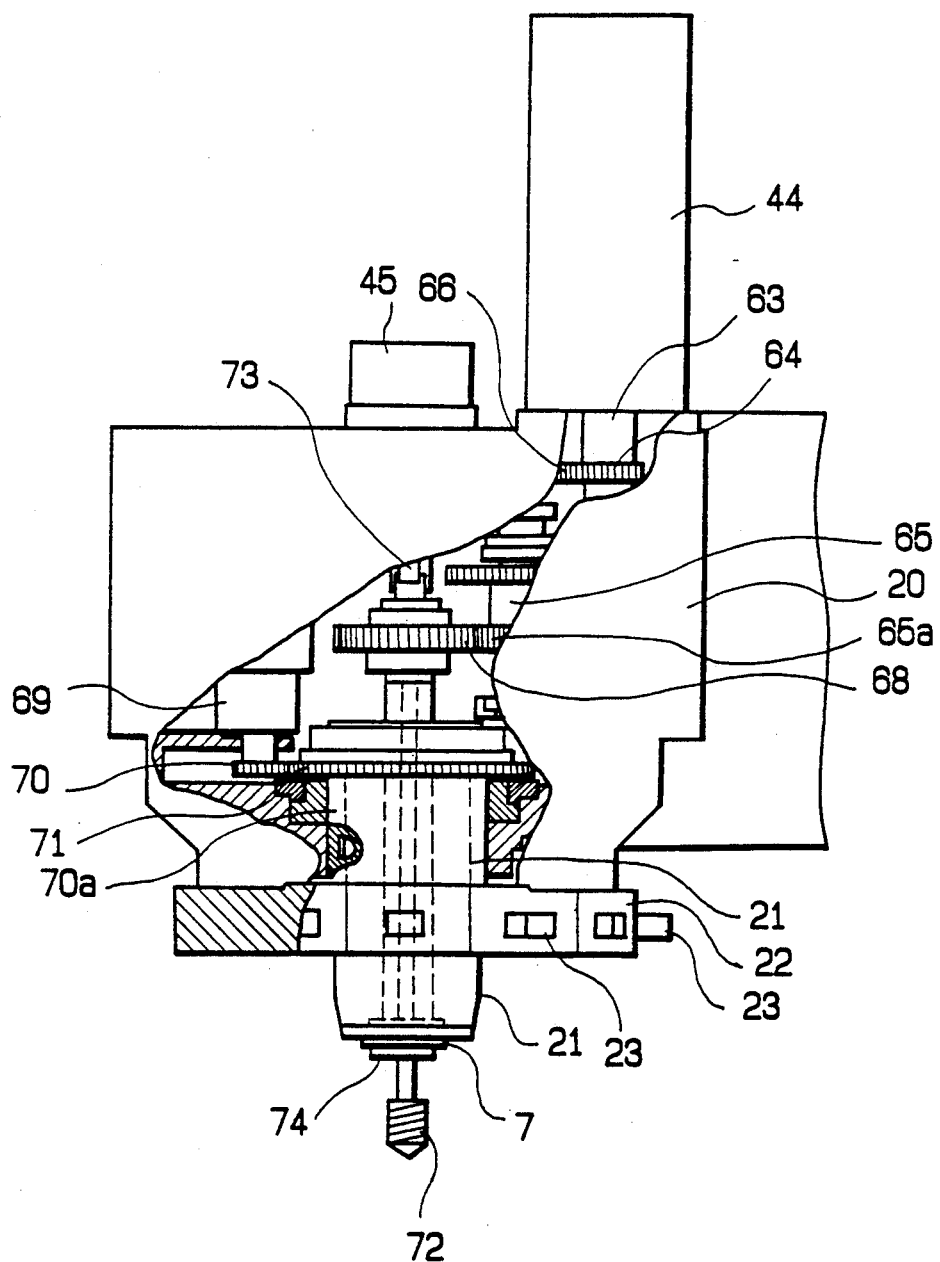
FIG. 6 is a side elevational view, with portions broken away, of a spindlehead.

FIG. 6 shows the interior of the spindlehead 20. A gear 64 is attached to an output shaft 63 of the motor 44. A gear 66 attached to a shaft 65 engages the gear 64. A gear 65a attached to the shaft 65 engages a gear 68 of a shaft 67. The shaft 67 connects with the spindle 21. Thus, the spindle 21 can be rotated by operating the motor 44. The spindle 21 is equipped with a collet chuck (not shown). By operating the actuator 45, a holder 74 for the endmill 72 can be held in or removed from the collet chuck.

Still referring to FIG. 6, a gear 70 is attached to a servomotor 69. A gear 71 of a cylindrical portion 70a engages the gear 70. The cylindrical portion 70a is constructed in one-piece with the turret member 22. The spindle 21 passes through the cylindrical portion 70a. Thus, by operating the servomotor 69, the turret member 22 can rotate in the clockwise direction or counterclockwise direction for positioning operations.

The above mentioned motors and servomotors are controlled according to the program of the CNC unit 8.

OPERATION

Referring to FIG. 3, the spindlehead 20 is positioned in an initial position P. The servomotor 41 is operated to thereby move the spindlehead 20 in the direction of arrow $Z_1$.

Figure 7:
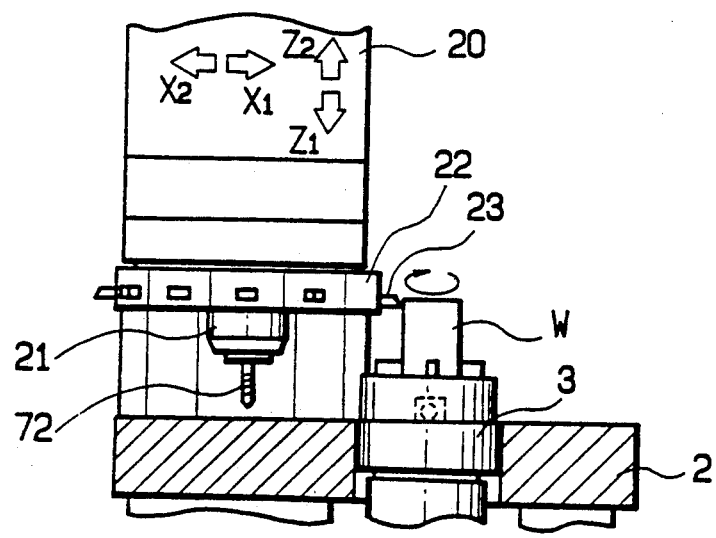
FIG. 7 illustrates a condition in which turning operation of a workpiece is performed.

Referring to FIG. 7, the endmill 72 has been attached in the spindle 21. After that, the spindlehead 20 is moved in the direction of arrow $X_1$, and the rotary table 3 rotates relative to the table 2. Thus, a toolbit 23 starts to machine the outer surface of the workpiece W. As the spindlehead 20 is moved down in the direction of the arrow $Z_1$, along a predetermined distance, the turning operation of the outer surface of the workpiece W can be performed. After that, the spindlehead 20 is moved in the direction of arrow $Z_2$ to remove the toolbit 23 from the workpiece W.

Figure 8:
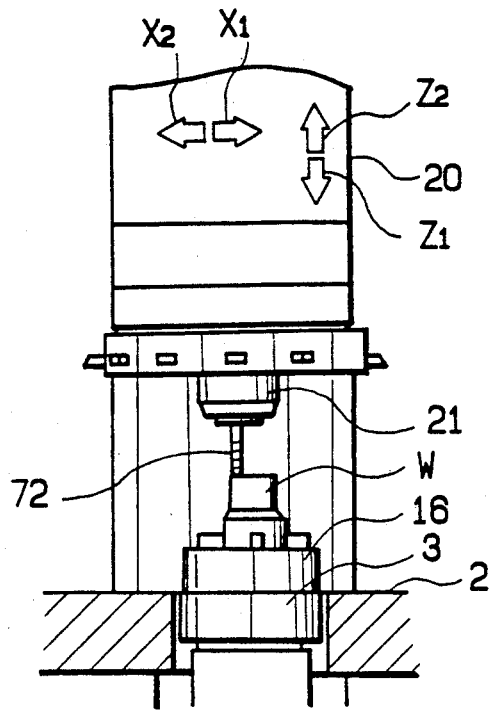
FIG. 8 illustrates a condition in which slotting operation of the workpiece is performed.
Figure 9:
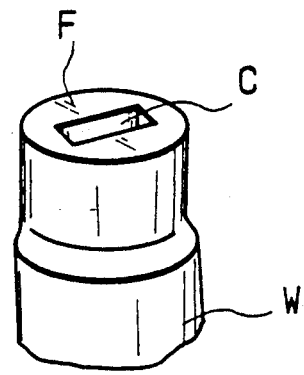
FIG. 9 is a perspective view showing the workpiece having a slot.

Referring to FIGS. 8 and 9, a slot C will be produced in the upper side of the workpiece W. The spindlehead 20 is moved in the direction of the arrow $X_1$ and moved down in the direction of arrow $Z_1$. Thus, the endmill 72 of the spindle 21 is moved toward the upper side F of the workpiece W. After that, the spindlehead 20 is moved down to a predetermined depth of cut in the direction $Z_1$ and then moved along a predetermined distance in the direction of arrow $X_1$. Accordingly, the slot C in FIG. 9 can be produced. After producing the slot C, the spindlehead 20 is moved in the direction of arrow $Z_2$, and then moved to the initial position P. After that, the endmill 72 of the spindle 21 is exchanged for a drill 16 of the automatic tool changer 7. The exchanging operation is performed by a conventional exchange arm.

Figure 10:
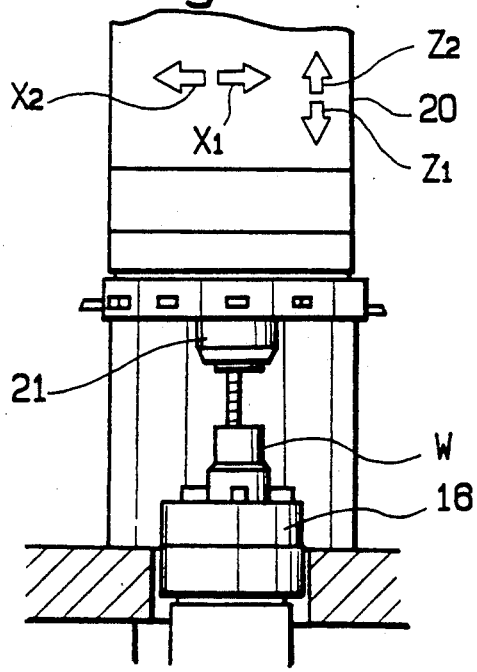
FIG. 10 illustrates a condition in which a drilling operation of the workpiece is performed.
Figure 11:
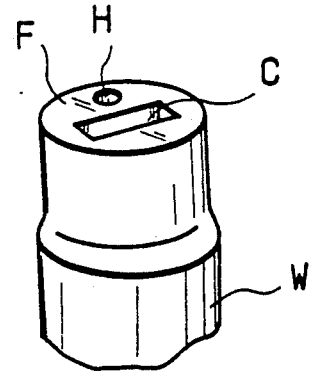
FIG. 11 is a perspective view showing the workpiece having a drilled hole.

Referring to FIGS. 10 and 11, the spindlehead 20 is moved in the directions of arrows $X_1$, and $Z_1$, to advance the drill 16 toward the upper side F of the workpiece W. After that, the spindlehead 20 is moved in the direction of $Z_1$, to produce a hole H having a predetermined depth at its predetermined position of the workpiece W. After that, the spindlehead 20 is moved back to the initial position P.

As can be seen from the foregoing, the turning operation of the outer surface of the workpiece W, the production of the slot C and the production of the hole H are performed in the above-mentioned manner.

Figure 12:
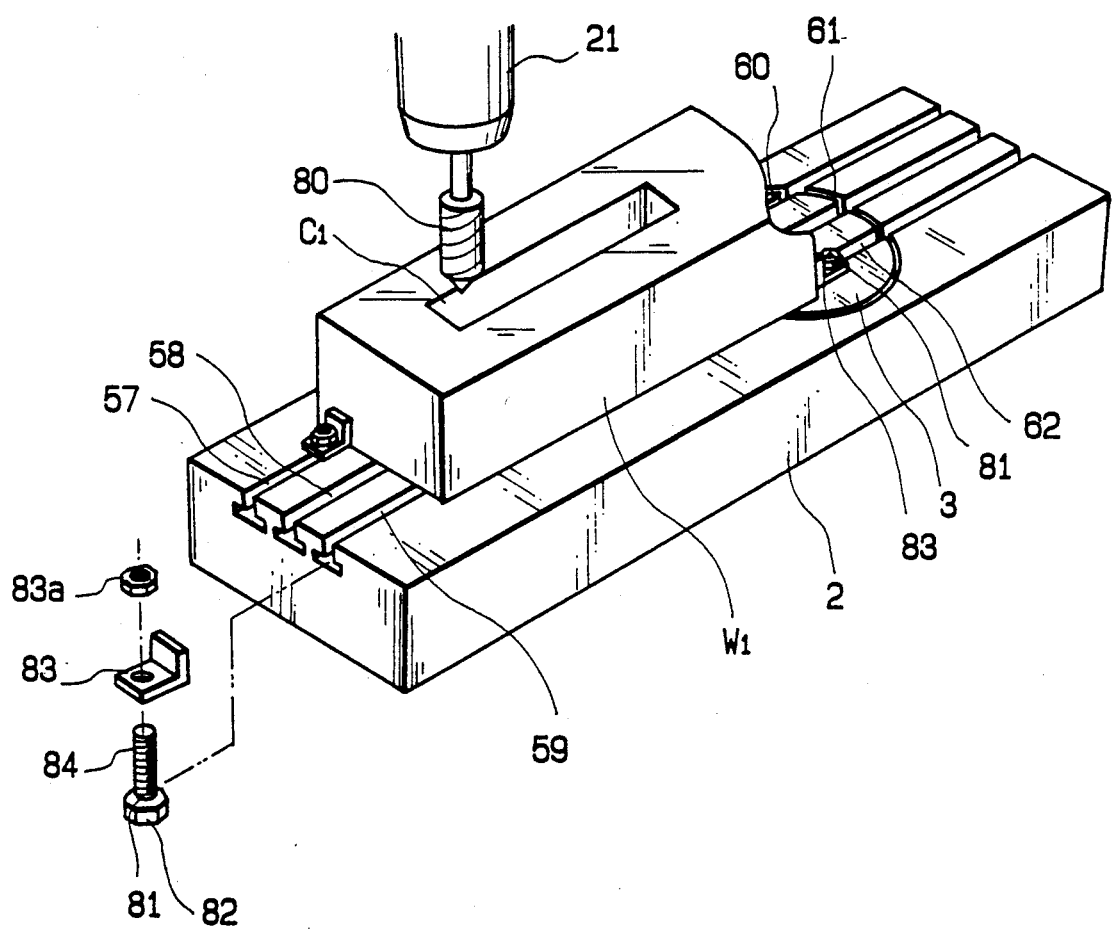
FIG. 12 is a perspective view showing a workpiece mounted on both the table and the rotary table.

Referring to FIG. 12, a workpiece W1 having a relativity large rectangular shape is mounted on both the table 2 and the rotary table 3. A head 82 of a bolt 81 is fitted into each of the T-slots 57, 59. A male-screw portion 84 of the bolt 81 passes through a hole of a holder 83. A male-screw portion 84 engages a nut 83a. On the other hand, a head of a bolt 81 is fitted into each of the T-slots 60, 62. Each bolt 81 is held by a holder 83. The workpiece $W_1$ is fixed on the table 2 and the rotary table 3 by means of the four holders 83. The endmill 80 is mounted in the spindle 21 and thus produces a slot $C_1$, for example, in the workpiece $W_1$.

Figure 13:
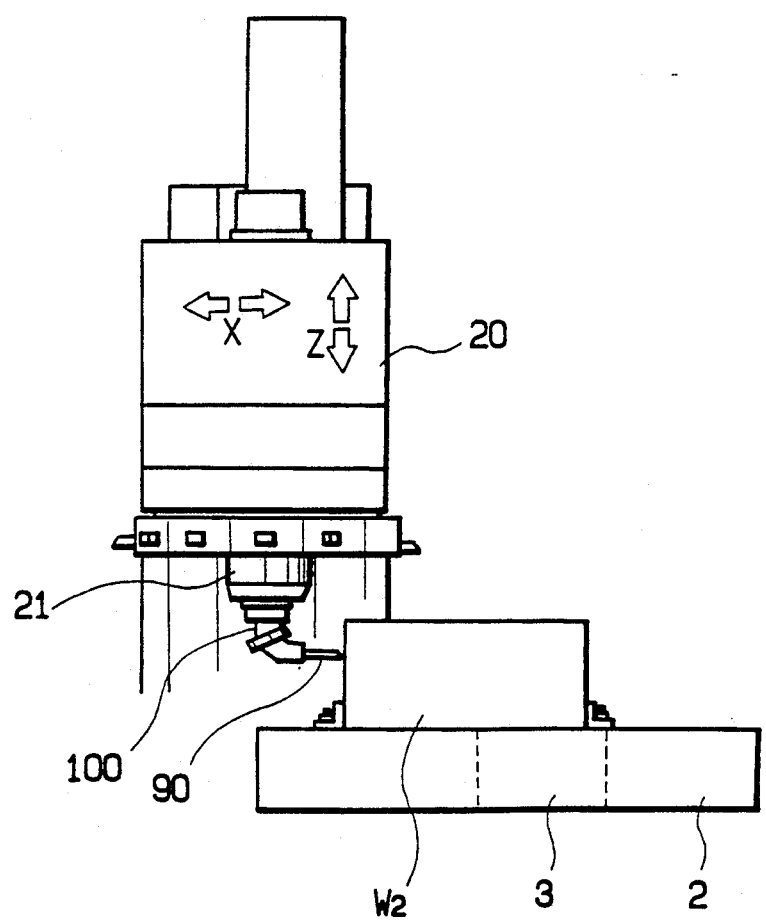
FIG. 13 illustrates a condition in which drilling operation of a workpiece is performed in the end face of the workpiece.

Referring to FIG. 13, a special universal head 100 is mounted in the spindle 21 for this embodiment. An universal head disclosed in Japanese Patent Application No. 60-254886 can be used as the universal head 100. A drill 90 is mounted in the universal head 100. By turning the drill 90, there is produced a hole in a side face of the workpiece $W_2$. The workpiece $W_2$ is fixedly mounted on both the table 2 and the rotary table 3.

In the embodiment, it is easy to make arrangements for machining because the table 2 is fixed. If the workpiece $W_2$ is mounted on the table by a robot, it is easy to position the workpiece on the table 2.

Figure 14:
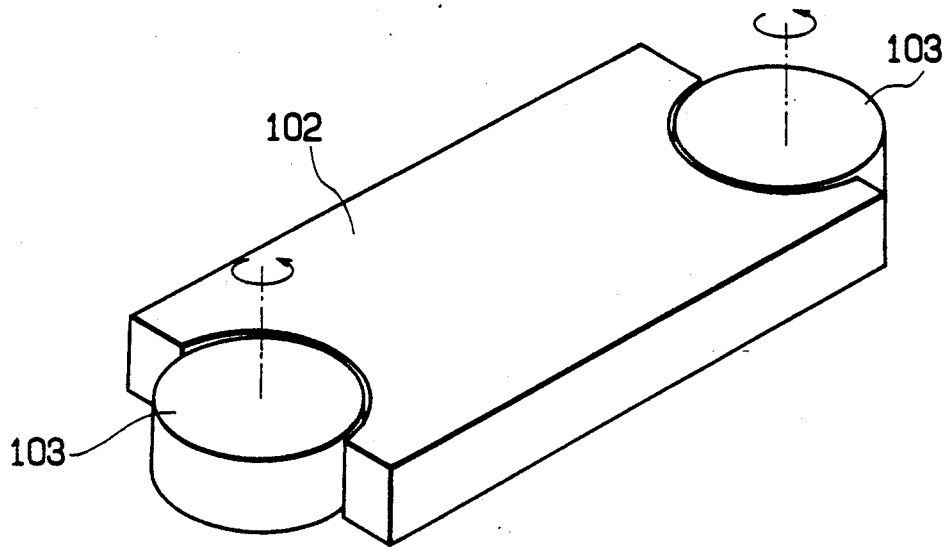
FIG. 14 and 15 are perspective views showing other embodiments of tables and rotary tables of this invention.
Figure 15:
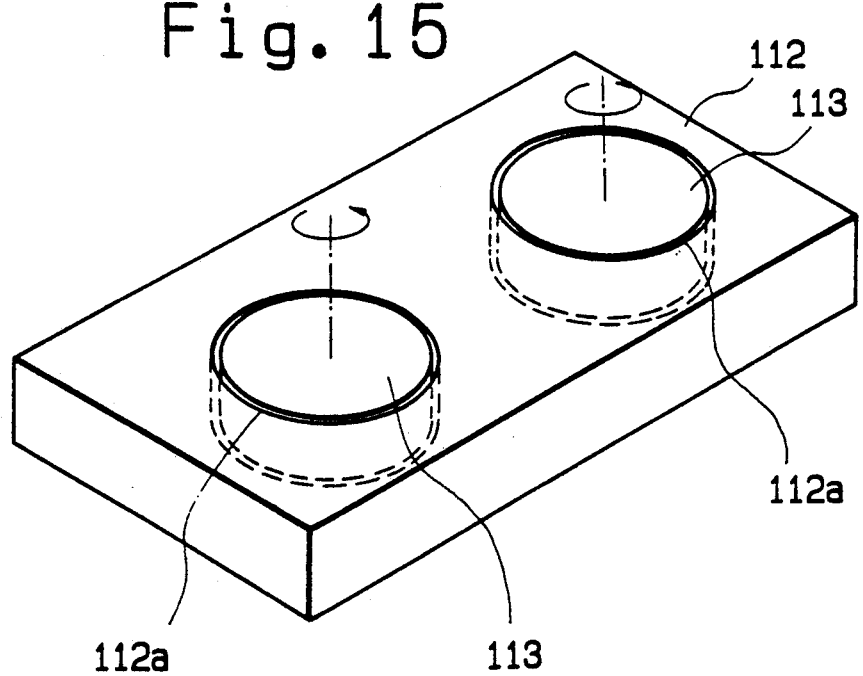

FIGS. 14 and 15 show other embodiments of a table and rotary tables. FIG. 14 shows rotary tables 103, 103 which are rotatably arranged at the both sides of the table 102, respectively.

In an embodiment of FIG. 15, holes 112a, 112a each having a circular cross-section are machined in a table 112. A rotary table 113 is arranged within the hole 112a.

Figure 16:
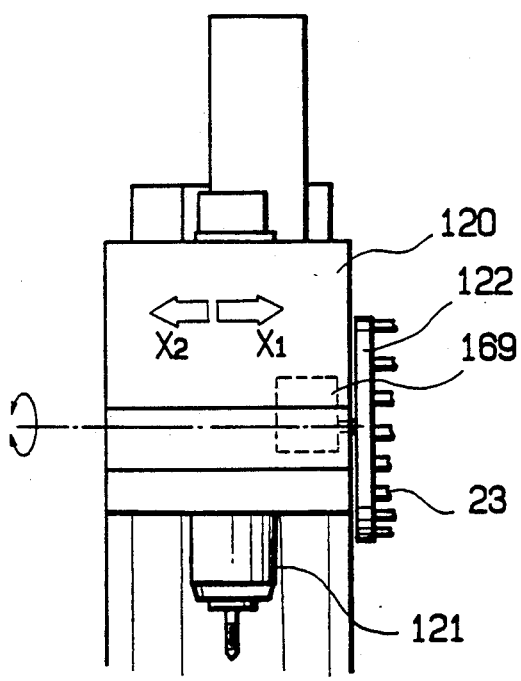
FIG. 16 shows a spindlehead equipped with a turret member.

FIG. 16 shows an embodiment in which a turret member 122 is rotatably attached to a side portion of a spindlehead 120. The turret member 122 is equipped with a multitude of toolbits 23. The turret member 122 can be rotated and positioned by a servomotor 169 equipped within the spindlehead 120.

This invention is not limited to the above-mentioned embodiments.

For example, the table 2 and the rotary table 3 may tilt with respect to the base. The table 2 and rotary table 3 may be electro-magnetic chucks. The table 2 and the rotary table 3 may be moved in the direction of $X_1$ or $X_2$, in the direction of $Y_1$, or $Y_2$, or in the direction of $Z_1$ or $Z_2$ with respect to the base 4.

The chuck mounted on the rotary table 3 may be not only a hydraulic power chuck but also any other type chuck such as a scroll chuck. The rotary table 3 may be indexed by an index servomotor.

In addition, a tap may be mounted in the spindle to perform the tapping operation of a workpiece. As can be seen from the foregoing, by selecting tools, the machining operations of the workpiece such as turning, drilling, boring, milling and tapping, that is, the combination of operations for the workpiece can be performed.

What is claimed is:

1. A machine tool comprising:

a base;

a rotary table;

a non-rotary table arranged with respect to the base, the non-rotary table being equipped with the rotary table;

the non-rotary table being arranged with an upper face thereof flush with an upper face of the rotary table;

a first mounting means for mounting a workpiece on the rotary table;

a second mounting means for mounting the workpiece on the non-rotary table;

a column provided to the base;

a means for storing a plurality of tools;

a head means provided to the column;

a spindle mounted on the head means for mounting one of the tools so as to machine an end face of the workpiece;

a turret means mounted on the head means;

a first drive means for causing relative motion between either the head means or the turret means and either the rotary table or the non-rotary table along an X-axis;

a second drive means causing relative motion between either the head means (20) or the turret means (22) and either the rotary table or the non-rotary table along a Y-axis perpendicular to the X-axis;

a third drive means for causing relative motion between either the head means or the turret means and either the rotary table or the non-rotary table along a Z-axis perpendicular to both the X-axis and the Y-axis;

a fourth drive means for rotating the rotary table;

a fifth drive means for indexing the turret means;

a sixth drive means for revolving the spindle;

the head means, the spindle, and the turret means being positioned above either the upper face of the non-rotary table or the upper face of the rotary table;

the rotary table being rotated about a first axis parallel to the Z-axis directed in a vertical direction; and the turret means adapted for mounting a plurality of further tools to machine a circumference of the workpiece on the rotary table by revolution of the rotary table, and the turret means being indexed about a second axis parallel to the Z-axis so as to position one of the further tools of the turret means at a predetermined position by the fifth drive means.

2. The machine tool defined in claim 1, wherein the first mounting means comprises a groove or slot formed on the rotary table and a holding means fit into the groove or slot, and the second mounting means comprises a grove or slot formed on the non-rotary table and a holding means fit into the groove or slot.

3. The machine tool defined in claim 1, wherein the first mounting means comprises a T-slot formed on the rotary table and the second mounting means comprises a T-slot formed on the non-rotary table.

4. The machine tool defined in claim 2, wherein the first mounting means comprises a T-slot formed on the rotary table and the second mounting means comprises a T-slot formed on the non-rotary table.

5. The machine tool defined in claim 2, wherein the groove or slot on the rotary table can be aligned with the groove or slot on the non-rotary table so as to mount a further workpiece relative to both the rotary table and the non-rotary table when the rotary table is set at a predetermined position.

6. The machine tool defined in claim 1, wherein the rotary table is positioned in the center of the non-rotary table.

7. The machine tool defined in claim 1, wherein the rotary table is positioned in vicinity of the side portion of the non-rotary table.

8. The machine tool defined in claim 1, wherein a chuck is detachably mounted on the rotary table and thus a workpiece can be clamped by plurality of jaws of the chuck.

9. The machine tool defined in claim 1, further comprising a computer numerical control unit for controlling the first drive means, the second drive means, the third drive means, the fourth drive means, the fifth drive means, and the sixth drive means.

10. The machine tool defined in claim 1 wherein said workpiece is round, said turret means mounting tools to machine a round circumference of the round workpiece.

* * * * *